United States Patent
Honkura et al.

(10) Patent No.: US 9,312,055 B2
(45) Date of Patent: Apr. 12, 2016

(54) CASE-INTEGRATED BONDED MAGNET AND PRODUCTION METHOD FOR SAME

(75) Inventors: Yoshinobu Honkura, Tokai (JP); Hironari Mitarai, Tokai (JP); Hiroshi Matsuoka, Tokai (JP); Masayuki Kato, Tokai (JP); Ikuzou Okumura, Tokai (JP)

(73) Assignee: AICHI STEEL CORPORATION, Aichi (JP)

( * ) Notice: Subject to any disclaimer, the term of this patent is extended or adjusted under 35 U.S.C. 154(b) by 757 days.

(21) Appl. No.: 13/639,723

(22) PCT Filed: Apr. 5, 2011

(86) PCT No.: PCT/JP2011/058644
§ 371 (c)(1),
(2), (4) Date: Nov. 28, 2012

(87) PCT Pub. No.: WO2011/126026
PCT Pub. Date: Oct. 13, 2011

(65) Prior Publication Data
US 2013/0069747 A1    Mar. 21, 2013

(30) Foreign Application Priority Data

Apr. 5, 2010  (JP) ................................ 2010-086944

(51) Int. Cl.
*H01F 1/01* (2006.01)
*B29C 43/00* (2006.01)
(Continued)

(52) U.S. Cl.
CPC ................ *H01F 1/28* (2013.01); *B29C 43/003* (2013.01); *H01F 1/01* (2013.01); *H01F 1/083* (2013.01);
(Continued)

(58) Field of Classification Search
CPC ......... H01F 1/01; H01F 1/083; H01F 1/0578; H01F 41/0273; H01F 41/028; H01F 41/0266; H02K 15/03; B29C 43/003

USPC .......................................................... 148/105
See application file for complete search history.

(56) References Cited

U.S. PATENT DOCUMENTS

| 5,149,477 A * | 9/1992 | Yamashita et al. ............ 264/112 |
| 6,001,272 A | 12/1999 | Ikuma et al. |
| 2008/0124235 A1 | 5/2008 | Honkura et al. |

FOREIGN PATENT DOCUMENTS

| JP | 09-260170 A | 10/1997 |
| JP | 09-312207 A | 12/1997 |

(Continued)

OTHER PUBLICATIONS

Extended search report issued in European Application No. 11765926.8, dated Mar. 7, 2014.
(Continued)

*Primary Examiner* — Jessee Roe
(74) *Attorney, Agent, or Firm* — Michael Best & Friedrich LLP

(57) ABSTRACT

A production method for a case-integrated bonded magnet includes: filling a tubular cavity with a magnet raw material that includes a rare-earth magnet powder and a thermosetting resin binder; heating the magnet raw material to cause the thermosetting resin softened or melted while compressively molding the magnet raw material to obtain a tubular compact; discharging the tubular compact from the tubular cavity while press-fitting the tubular compact into a metal tubular case having an inner peripheral surface coaxial with the tubular cavity; and heat-curing the tubular compact with the tubular case to cure the thermosetting resin. The tubular compact press-fitted into the tubular case is thermally cured thereby causing the tubular compact to transform to a tubular bonded magnet, which expands unexpectedly due to heat.

6 Claims, 2 Drawing Sheets

(51) Int. Cl.
*H01F 1/28* (2006.01)
*H01F 1/08* (2006.01)
*H02K 15/03* (2006.01)
*H01F 41/02* (2006.01)
*H01F 1/057* (2006.01)

(52) U.S. Cl.
CPC .......... *H01F 41/028* (2013.01); *H01F 41/0266* (2013.01); *H01F 41/0273* (2013.01); *H02K 15/03* (2013.01); *H01F 1/0578* (2013.01)

(56) References Cited

FOREIGN PATENT DOCUMENTS

| | | |
|---|---|---|
| JP | 2000-184642 A | 6/2000 |
| JP | 2002-223539 A | 8/2002 |
| JP | 2005-033844 A | 2/2005 |
| WO | WO-2006/001304 A1 | 1/2006 |

OTHER PUBLICATIONS

International Search Report, mailed Jun. 28, 2011.

* cited by examiner

CASE-INTEGRATED BONDED MAGNET AND PRODUCTION METHOD FOR SAME

TECHNICAL FIELD

The present invention relates to a case-integrated bonded magnet obtained by integrating a tubular bonded magnet and a tubular case and also relates to a production method for the same.

BACKGROUND ART

A bonded magnet obtained by compressively molding a compound comprised of rare-earth magnet powder and thermosetting resin (binder) (referred also to as "bonded magnet" hereinafter) has various advantages such as that a large magnetic flux density can be obtained even in small size and the degree of freedom is large in molding, for example, in making a thin magnet. For this reason, bonded magnets are preferable as permanent magnets for field magnets to be used for high-performance motors, which are strongly required to output high power and conserve energy as well as to be reduced in size and weight, and the demand for bonded magnets is rapidly increasing.

In accordance with such an increase in demand, cost reduction is severely required not solely for bonded magnets but also for the whole parts including bonded magnets. Here, rare-earth elements as the main raw materials for bonded magnets may not be available in low cost. In this regard, in order to allow for the cost reduction, it is important to reduce the number of working steps required for producing the entire of a bonded magnet and a case to store the bonded magnet (i.e. case-integrated bonded magnet), to reduce the amount of time required for each working step (reduction in takt time), and to reduce components used for the production. Relevant proposals are disclosed in PTL (Patent Literature) below.

CITATION LIST

Patent Literature

[PTL 1]
Japanese Unexamined Patent Application Publication No. 2005-33844
[PTL 2]
Japanese Unexamined Patent Application Publication No. 2000-184642
[PTL 3]
WO 2006/1304

SUMMARY OF INVENTION

Technical Problem

In PTL 1, a case-integrated bonded magnet is produced in the following manner. Compound is subjected to heating and compression molding, and a tubular compact is taken out from a molding die. This tubular compact is further solely heated to cause thermosetting resin as a binder to be thermally cured (cure thermal process). A tubular bonded magnet is thus preliminarily prepared to ensure a sufficient strength, and further in the subsequent step, the tubular bonded magnet is press-fitted into the inner peripheral side of a tubular case which has been separately heated. A case-integrated bonded magnet is thereby obtained. According to this method, it is easy to adjust a pressure-bonding force (extracting load) between the tubular bonded magnet and the tubular case to a desired value by setting a press-fitting margin therebetween. Therefore, no adhesive is necessary for fixing the bonded magnet to the case, and the magnetic characteristics are stabilized while the production cost for case-integrated bonded magnets is reduced. However, the method of PTL 1 may have to require a number of steps.

In PTL 2, a tubular compact for a bonded magnet in cold state is engaged with a gap into a case (yoke) having a larger inner diameter than the outer diameter of the tubular compact, and the both are then heated in the air. This causes the tubular compact (bonded magnet) to be oxidized and expanded in the case, and a case-integrated bonded magnet is obtained in which the bonded magnet is pressure-bonded in the case. According to this method, no adhesive is necessary like PTL 1, and in addition to this, a case-integrated bonded magnet can be obtained without performing a press-fitting step after the cure thermal process. However, epoxy resin used as a binder in PTL 2 has in general tendency of cure contraction when being heated to be cured. In addition, the present inventors' research has revealed that the oxidization expansion amount of the tubular compact (bonded magnet) is slightly little. It thus appears that the method as disclosed in PTL 2 is difficult to cause a sufficient pressure-bonding force between the bonded magnet and the case.

In PTL 3, a case-integrated bonded magnet is produced by utilizing spring-back caused when the tubular compact is taken out from the molding die rather than utilizing the oxidization expansion in PTL 2. According to this method, like PTL 2, no adhesive and no press-fitting step after the cure thermal process is necessary. However, in order to ensure a sufficient pressure-bonding force between the bonded magnet and the case, the magnet raw material mixed with carbon fine powder has to be subjected to compression molding with considerably high pressure such as about 9 tons (900 MPa), as described in PTL 3. This rather increases the production cost for case-integrated bonded magnets and deteriorates the magnetic characteristics. In addition, according to the method of PTL 3, the compression molding is performed in cold state for the purpose of causing large spring-back, so that it is difficult to obtain a dense bonded magnet or an aligned bonded magnet.

The present invention has been created in view of such circumstances, and objects of the present invention include providing a case-integrated bonded magnet in which a case and a bonded magnet are integrated with sufficient pressure-bonding force and also providing a production method which can efficiently produce the same at low cost.

Solution to Problem

As a result of intensive studies to solve such problems and repeating trial and error, the present inventors have succeeded in press-fitting a tubular compact, obtained by subjecting a magnet raw material to heating/compression-molding, into a tubular case without any additional action while discharging the tubular compact from a tubular cavity. It has also been newly found out that, by subjecting the tubular compact and the tubular case in press-fitting state obtained in such a manner to cure thermal process, a case-integrated bonded magnet is obtained in which the tubular case and the tubular bonded magnet is rigidly integrated with each other. Developing this achievement, the present inventors have accomplished various aspects of the present invention as will be described hereinafter.

<Production Method for a Case-Integrated Bonded Magnet>

(1) The production method for a case-integrated bonded magnet according to the present invention is characterized by comprising: a filling step that fills a tubular cavity with a magnet raw material, the magnet raw material including one or more types of rare-earth magnet powder and a thermosetting resin to be a binder; a heating/molding step that heats the magnet raw material to cause the thermosetting resin to be in softened state or molten state while compressively molding the magnet raw material to obtain a tubular compact; a discharging/press-fitting step that discharges the tubular compact from the tubular cavity while press-fitting the tubular compact into a metal tubular case having an inner peripheral surface coaxial with the tubular cavity; and a heat-curing step that heats the tubular compact with the tubular case to cure the thermosetting resin, wherein a case-integrated bonded magnet is obtained in which a tubular bonded magnet formed from the tubular compact is integrated with the tubular case.

(2) According to the production method of the present invention, at first in the discharging/press-fitting step, the tubular compact with residual heat immediately after the heating/molding step is discharged from the tubular cavity while being directly press-fitted into the metal tubular case. If the tubular compact and the tubular case after this discharging/press-fitting step are heated to cause the thermosetting resin (binder) in the tubular compact to be thermally cured, then a case-integrated bonded magnet is obtained in which a tubular bonded magnet (i.e. the tubular compact in which the thermosetting resin has been thermally cured) and the tubular case are integrated with each other by stronger pressure-bonding force than expected. Therefore, according to the present invention, a case-integrated bonded magnet can efficiently be produced even without using adhesive and other bonding agents, while omitting the press-fitting step after the cure thermal process. That is, the production cost and the price of a case-integrated bonded magnet can be further reduced.

(3) Meanwhile, the mechanism that such a case-integrated bonded magnet could be obtained according to the producing method of the present invention is not necessarily sure, but it may be considered under present circumstances as follows.

At first, the reason why the discharging/press-fitting step according to the present invention could be enabled is considered as follows. Heretofore, it has been believed that a tubular compact discharged from the tubular cavity immediately after a heating/compression-molding is difficult to be press-fitted into the tubular case because the thermosetting resin as the binder is in uncured state and the tubular compact is in a state of remaining heat (warm state) thereby to exhibit extremely low strength and/or stiffness. In particular, it has been believed that buckling or the like occurs to collapse the shape of a tubular compact which has a thin wall-thickness (due to small gap width of the tubular cavity) and which is long in the axial direction, when the compact is press-fitted into the tubular case.

However, actual experiments performed by the inventors revealed that the tubular compact was able to be press-fitted into the tubular case even immediately after being subjected to the heating/compression-molding under less molding pressure. The reasons appear to include that the tubular compact even immediately after the heating/molding step had a strength and/or stiffness to the extent necessary for retaining the shape during the press-fitting because the heat curing of the thermosetting resin had progressed even during the heating/molding step.

It should be appreciated, however, that the strength and stiffness at that time are smaller than those when the thermosetting resin has completed to be thermally cured. Accordingly, the tubular compact press-fitted into the inner peripheral side of the tubular case also has a plasticity which allows some deformation of the tubular compact along the inner peripheral surface of the tubular case, and unduly large stress is thus avoided from acting on the tubular compact at the time of press-fitting. For such a reason, it appears that the tubular compact immediately after the heating/compression-molding had moderate strength and stiffness in combination with some plasticity thereby being allowed to be press-fitted into the tubular case along the inner peripheral surface of the tubular case without buckling and/or collapsing.

Next, the reason is considered as follows, why the case-integrated bonded magnet was obtained in which the tubular case and the tubular bonded magnet were rigidly integrated with each other after the heat-curing step. At first, the thermosetting resin as the binder changes in its linear thermal expansion coefficient before and after the heat-curing (cure thermal process) (refer to FIG. 3). Specifically, the linear thermal expansion coefficient of the thermosetting resin is relatively large before its curing (cross-linking) reaction while drastically becoming small after the curing reaction. Consequently, if the thermosetting resin is heated to be thermally expanded during the cure thermal process thereafter being cooled, the thermosetting resin will not be thermally contracted to the original dimensions. In other words, a certain thermal expansion amount remains depending on the difference in linear thermal expansion coefficient between before and after the heat-curing.

Such circumstances similarly apply to the tubular compact in which the thermosetting resin is used as the binder and therefore to the tubular bonded magnet. As such, if there is no restraint by the tubular case, then the dimensions of the tubular bonded magnet after the heat-curing step will expand beyond those of the tubular compact before the heat-curing step due to the remaining thermal expansion amount (referred to as "residual thermal expansion amount" hereinafter).

According to the present invention, in practice, the heat-curing step is performed in a state where the tubular compact is accommodated in the tubular case. Therefore, the residual thermal expansion amount caused in the tubular bonded magnet is not directly reflected to the dimensional change in the tubular bonded magnet. That is, the residual thermal expansion amount acts to cause a strong compressive stress (pressure-bonding force) between the outer peripheral surface of the tubular bonded magnet and the inner peripheral surface of the tubular case which restrains the tubular bonded magnet.

Moreover, intensive researches by the present inventors have further revealed that a dimensional measurement shows that a large thermal expansion amount far beyond the above-described residual thermal expansion amount is caused in the tubular bonded magnet after the cure thermal process for the tubular compact of which the outer peripheral surface has been applied thereto with the compression stress. Although the reason why such a phenomenon occurs is not sure, it appears that the compressive stress imparted to the tubular compact before the cure thermal process is accumulated as an internal stress (particularly as an internal compressive stress) and this internal stress is released during the cure thermal process thereby causing a larger thermal expansion in the thermosetting resin than expected. The thermal expansion amount caused by the release of the internal stress accumulated in the tubular compact in such a manner is referred herein to as "release thermal expansion amount".

In addition to the above, it has also been revealed that the release thermal expansion amount is unlikely to be affected by the magnitude of the internal stress accumulated in the tubular compact before the cure thermal process. Therefore, the tubular compact is not required to be imparted with unduly large internal stress, and a sufficiently large release thermal expansion amount can be caused if the internal stress is imparted to the tubular compact with such an extent of not collapsing the tubular compact immediately after the heating/molding step. Further, the internal (compressive) stress necessary for the generation of the release thermal expansion amount can be easily caused by press-fitting the tubular compact into the tubular case during the discharging/press-fitting step according to the present invention.

Here, according to the present invention, the heat-curing step is performed for the tubular compact in a state where the tubular compact is accommodated in the tubular case as described in the above. Therefore, like the previously-described residual thermal expansion amount, the release thermal expansion amount caused in the tubular bonded magnet is not to be directly reflected in the dimensional change of the tubular bonded magnet. That is, the release thermal expansion amount acts to cause a strong compressive stress (pressure-bonding force) between the outer peripheral surface of the tubular bonded magnet and the inner peripheral surface of the tubular case which restrains the tubular bonded magnet.

Meanwhile, the pressure-bonding force (surface pressure) caused between the outer peripheral surface of the tubular bonded magnet and the inner peripheral surface of the tubular case is, if both are hollow-cylindrical, determined by the diameter of the portion where the both are contacted with each other, and respective thicknesses and moduli of longitudinal elasticity and a press-fitting margin. Therefore, the surface pressure therebetween increases not only when the press-fitting margin (apparent margin) determined on the basis of the above-described residual thermal expansion amount and release thermal expansion amount (or strain amount based thereon) increases but also when the modulus of longitudinal elasticity of the tubular bonded magnet increases.

Here, the modulus of longitudinal elasticity of the tubular case does not change in general before and after the cure thermal process, but the modulus of longitudinal elasticity (Young's modulus: E) of the thermosetting resin and therefore of the tubular bonded magnet change before and after their heat-curing (before and after the cure thermal process). Specifically, the modulus of longitudinal elasticity after the heat-curing is larger than that before the heat-curing. Due to this increase in the modulus of longitudinal elasticity after the cure thermal process, the pressure-bonding force caused between the tubular bonded magnet and the tubular case is to be further enhanced.

As a result, according to the producing method of the present invention, due to that the thermosetting resin in the tubular compact after the discharging/press-fitting step thermally cures during the heat-curing step, the tubular bonded magnet is caused to increase in the residual thermal expansion amount, in the release thermal expansion amount and in the modulus of longitudinal elasticity. It appears that the above increases act additively or synergistically thereby allowing the case-integrated bonded magnet to be obtained in which the tubular bonded magnet is rigidly integrated with the tubular case.

Incidentally, when one of the present inventors made a longitudinal cut (in the axis direction) on the side surface of the case-integrated bonded magnet according to the present invention (outer peripheral surface of the tubular case), the tubular case and the tubular bonded magnet were able to be relatively easily separated from each other. This fact supports that the strong pressure-bonding force caused between the tubular case and the tubular bonded magnet is basically due to the mechanical stress caused mainly by the press-fitting state rather than due to adhesion of the binder such as the thermosetting resin to the inner peripheral surface of the tubular case.

<Case-Integrated Bonded Magnet>

The present invention covers not only the above-described production method but also a case-integrated bonded magnet obtained thereby.

<Others>

(1) In addition to the above-mentioned steps, the production method for a bonded magnet according to the present invention may comprise additional steps, such as a magnetizing step that performs magnetization to the case-integrated bonded magnet after the heat-curing step and an anti-corrosion process step that performs painting, plating and/or other appropriate treatments.

(2) The "softened state" or "molten state" as used in the present invention is not to be strictly distinguished. In essence, it is enough if a resin is heated to reduce its viscosity thereby leading to a state where each particle of the rare-earth magnet powder is possible to change its posture, such as to rotate and move.

(3) The "tubular" as used herein for the tubular cavity, the tubular case, the tubular compact or the tubular bonded magnet according to the present invention may involve various cross-sectional view shapes in the axis direction falling within the spirit of the present invention, but typically means hollow cylindrical.

(4) Dimensions as used herein of the tubular cavity and the tubular case etc. and dimension ratios based thereon are those during the discharging/press-fitting step.

(5) Unless otherwise stated, a numerical range "x to y" as used herein includes the lower limit value x and the upper limit value y. Using various numerical values or any numerical values included in numerical ranges described herein as a new lower limit value or upper limit value, a newly-created numerical range such as "a to b" may be possible.

REFERENCE SIGNS LIST

Figure 1:
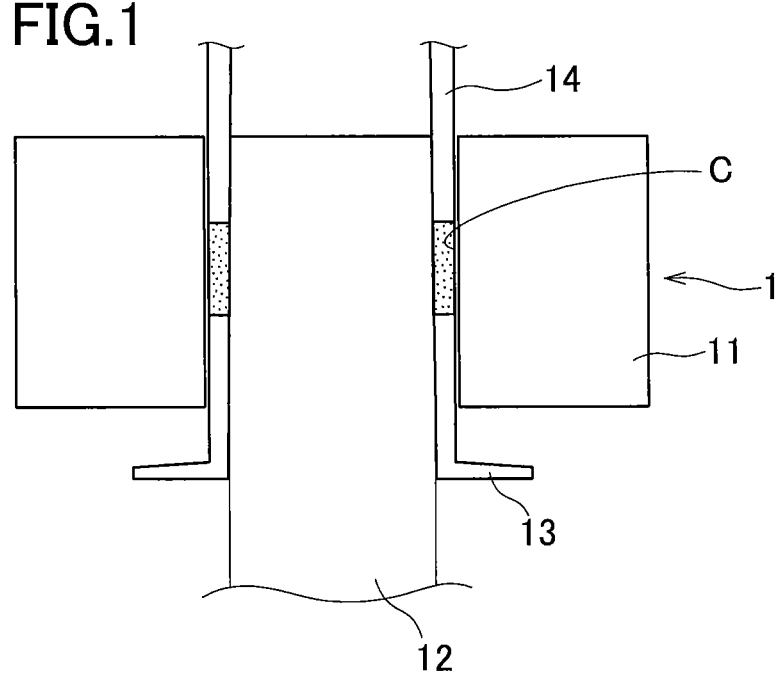
FIG. 1 is a schematic view illustrating an aspect of the heating/molding step.

1; molding die
H; housing (tubular case)
G; hollow cylindrical compact
B; hollow cylindrical bonded magnet

DESCRIPTION OF EMBODIMENTS

The present invention will be described more in detail with reference to embodiments thereof. One or more constitutional elements freely selected from the description herein may be added to the above-described constitutions of the present invention. Entities regarding a production method, when understood as a product-by-process, may also be entities regarding a product, and therefore, the contents described herein may be applicable not only to production methods for case-integrated bonded magnets but also to case-integrated bonded magnets in themselves. Note that whether or not either embodiment is the best is different in accordance with objectives, required properties and other factors.

<Case-Integrated Bonded Magnet>

(1) Magnet Raw Material

Magnet raw material comprises one or more types of rare-earth magnet powder and a binder. While the form of the magnet raw material is not limited, the magnet raw material is in the form of, for example, mixed powder of rare-earth magnet powder and resin powder, a compound obtained by heating and kneading to granulate the mixed powder, or a preliminary tubular compact (blank material) obtained by preliminarily compressively molding the weighed mixed powder and/or compound, etc.

The composition, type and other properties of rare-earth magnet powder are not limited, and any of magnet powder known in the art may be employed. Representative examples of rare-earth magnet powder include, for example, Nd—Fe—B based magnet powder, Sm—Fe—N based magnet powder, SmCo based magnet powder and other magnet powder. Further, the rare-earth magnet powder may be any of anisotropic magnet powder and isotropic magnet powder. Moreover, the rare-earth magnet powder may be produced by the so-called rapid solidification method, hydrogenation disproportionation desorption recombination method (HDDR method) or dynamic HDDR method (d-HDDR method). Furthermore, one type of rare-earth magnet powder may be solely used or a plurality of types may also be mixed to be used. For example, coarse powder with relatively large average particle diameter (e.g. 1 to 250 μm) may be mixed with fine powder with relatively small average particle diameter (e.g. 1 to 10 μm). In addition, the mixed powder may contain magnet powder, such as ferrite magnet powder, other than rare-earth magnet powder.

Composition of the binder is not limited if the binder includes thermosetting resin and is heated to be in a softened state or molten state during the heating/molding step. As the binder and particularly as the thermosetting resin, known materials in the art may be used, such as epoxy resin, unsaturated polyester resin, amino resin, phenol resin, polyamide resin, polyimid resin, polyamide-imide resin, urea resin and melamine resin. Among them, epoxy resin is preferable as the thermosetting resin because of having excellent properties such as handling ability and availability and of easily causing the above-described residual thermal expansion amount and release thermal expansion amount. Note that the binder or the thermosetting resin as used herein may contain, in addition to the base resin, any appropriate agent such as curing agent and curing assist agent.

The thermosetting resin as the binder is preferred to be within a range of 1 to 10 mass % to 100 mass % of the magnet raw material as the whole, and more preferred is 2 to 5 mass %. If the thermosetting resin is unduly less, then not only the strength of the tubular bonded magnet itself decreases but also the residual thermal expansion amount and the release thermal expansion amount may also become unduly less to thereby reduce the pressure-bonding force between the tubular bonded magnet and the tubular case. If, on the other hand, the thermosetting resin is too much, then the rare-earth magnet powder may relatively decrease to deteriorate the magnetic characteristics of the tubular bonded magnet.

In order to improve releasability at the time of molding (discharging ability of the tubular compact), wettability and/or adhesiveness between the softened or molten thermosetting resin and the magnet powder and other properties, the magnet raw material may further contain various additive agents with little amount. Examples of such additive agents include various types of metallic soaps, lubricant agent such as alcohol based lubricant agent, and titanate based or silane based coupling agent.

(2) Tubular Case

The outer shape of the tubular case is not limited if the tubular case has an inner shape into which the tubular compact is engaged. For example, the outer cross-sectional shape thereof may be any of circular, square, polygonal and other appropriate shapes. Depending on the use of the case-integrated bonded magnet, the tubular case is typically comprised of a magnetic material and may sometimes form a yoke or other component of an electric motor.

(3) Bonded Magnet

While the use of the case-integrated bonded magnet according to the present invention is not particularly limited, it is preferably used as a field magnet of a motor. Such a motor may be a direct-current (DC) motor or an alternate-current (AC) motor. The case-integrated bonded magnet according to the present invention is particularly preferable for a small-size motor which is strongly required to be produced at lower cost. Note that the case-integrated bonded magnet according to the present invention may be used at any of the rotor side and stator side.

<Production Method>

(1) Filling Step

The magnet raw material to be filled into the tubular cavity during the filling step may be mixed powder of rare-earth magnet powder and thermosetting resin powder etc, as described above, but preferred is a preliminary tubular compact obtained by preliminarily weighing and molding the mixed powder. It is thereby possible that the amount of time required for the filling step can be reduced and the production facilities can be simplified, and the production cost can thus be reduced for case-integrated bonded magnets.

(2) Heating/Molding Step

At first, it is enough if the thermosetting resin is heated during the heating/molding step to the extent that the thermosetting resin is softened or molten. In the case where the thermosetting resin is epoxy resin, the molding die which forms the tubular cavity may be heated to a range of 60° C. to 200° C., and preferably to a range of 140° C. to 180° C. This heating temperature (molding die temperature) is appropriately adjusted in accordance with the takt time. Note that the compression molding as will be described later may be performed after this heating, but it is efficient if both are performed in parallel.

Next, the compression molding during the heating/molding step is performed by pressing the magnet raw material filled in the tubular cavity in the molding die with one or more punches or other appropriate means. The molding pressure during this operation is not limited. If, however, the molding pressure is unduly low, then the strength of the tubular compact is reduced and the tubular compact is thus difficult to be press-fitted into the tubular case while retaining its shape. If, on the other hand, the molding pressure is unduly high, then the apparatus may be required to be large-scaled thereby increasing the production cost for case-integrated bonded magnets. In this regard, the molding pressure is preferred to be within a range of 50 to 500 MPa, and more preferably within a range of 100 to 200 MPa.

(3) Discharging/Press-Fitting Step

According to the discharging/press-fitting step, the tubular compact is discharged from the tubular cavity and press-fitted into the tubular case while remaining in warm state (or hot state). During this operation, the outer diameter as the outer peripheral side surface diameter of the tubular cavity is set such that the outer diameter (do) as the outer peripheral side surface diameter of the tubular compact is larger than the inner diameter (di) as the inner peripheral side surface diameter of the tubular case. This dimensional difference ($\Delta d = do - di$) is referred in the present invention to as the press-fitting margin during the press-fitting. Note that the press-fitting margin as used in the present invention may not necessarily be identical with a press-fitting margin between commonly-used rigid bodies (elastic bodies) because the tubular compact during the press-fitting has some plasticity. It may be sufficient to say that this press-fitting margin is an apparent press-fitting margin before the heat-curing (cure thermal process).

The surface pressure (po) caused between the outer peripheral surface of the tubular compact and the inner peripheral surface of the tubular case may not necessarily be considered as being equal to a surface pressure caused between commonly-used rigid bodies. However, since this surface pressure causes an internal stress to be accumulated in the tubular compact having been press-fitted into the tubular case, it is meaningful to discuss a parameter that may affect the surface pressure (po). Considering in general, the surface pressure (po) is affected not only by the dimensional difference ($\Delta d$) but also by the outer diameter (do) or the inner diameter (di). More specifically, the surface pressure (po) typically increases as the dimensional difference ($\Delta d$) increases while decreasing as the outer diameter (do) or the inner diameter (di) increases.

Studies on a press-fitting ratio ($\Delta r = \Delta d/do$) according to the present invention have shown that the press-fitting ratio ($\Delta r$) is preferred to be within a range of 0.0001 to 0.05 and more preferably within a range of 0.001 to 0.03, where the press-fitting ratio ($\Delta r$) is given by a ratio of the press-fitting margin ($\Delta d = do - di$) of the tubular compact to the outer diameter (do) of the tubular compact. If this press-fitting ratio is unduly small, then an internal stress enough for causing a sufficient release thermal expansion amount cannot be accumulated in the tubular compact. In addition, the handling ability will deteriorate because the tubular compact may easily escape from the tubular case. If, on the other hand, the press-fitting ratio is unduly large, then the tubular compact will be deformed such as being partially lost or collapsed in its shape thereby to make the press-fitting itself be difficult.

The "outer diameter (do) of the tubular compact" as used herein is a solely measured outer diameter of the tubular compact, which retains its shape, immediately after being discharged from the tubular cavity. That is, the outer diameter (do) of the tubular compact is an outer diameter of the tubular compact in a warm state immediately after being discharged from the tubular cavity without being press-fitted into the tubular case after the heating/molding step. If conditions during the filling step and the heating/molding step are identical, then outer diameters of tubular compacts discharged from the tubular cavities are every time substantially constant without accounting for negligible variations. Therefore, if the outer diameter (do) of the tubular compact to initially be a test piece is measured when the conditions for the filling step and the heating/molding step are not changed, then it can be said that the press-fitting margin or press-fitting ratio obtained on the basis of the measured outer diameter (do) of the tubular compact and the inner diameter (di) of the tubular case will be created every time between the tubular compact to be press-fitted and the tubular case.

Here, the outer diameter (do) of the tubular compact can be adjusted to a desirable value by changing the composition of the magnet raw material, the outer diameter (D) as the outer peripheral side surface diameter of the tubular cavity, conditions for the compression molding, and/or other factors. Conversely to say, the outer diameter (do) of the tubular compact may be affected by the outer diameter (D) of the tubular cavity, but both are not necessarily be the same. Typically, the tubular compact having been subjected to the compression molding in the tubular cavity tends to increase in its diameter to some extent after being discharged from the tubular cavity.

(4) Heat-Curing Step

According to the heat-curing step, the thermosetting resin in the tubular compact having been press-fitted into the tubular case is substantially completed to be thermally cured (e.g. with 80% or more of cure degree). The heating temperature during this operation may preferably be within a range of 120° C. to 230° C. and more preferably within a range of 170° C. to 220° C. if the thermosetting resin is epoxy resin. This allows the thermosetting resin to be completed with heat-curing in a short time such as 0.2 to 2 hours or preferably 0.4 to 1 hour.

This heat-curing step may be performed in the air or in an oxidation suppressing atmosphere. The former allows the production cost to be reduced while the latter may suppress the oxidation degradation of the rare-earth magnet powder and therefore the deterioration in magnetic characteristics of the tubular bonded magnet. Examples of the oxidation suppressing atmosphere include inert gas atmosphere, such as by argon gas or nitrogen gas, and vacuum ambient.

EXAMPLES

In order to more specifically describe the present invention, one example of a case of producing a stator for motor (case-integrated bonded magnet) will be mentioned in which a ring bonded magnet B (tubular bonded magnet) is incorporated in a hollow cylindrical housing H (tubular case). Note that the housing H is made of steel as magnetic material.

<Production of Case-Integrated Bonded Magnet>

(1) Magnet Raw Material

As the magnet raw material, a compound obtained by heating and kneading NdFeB based rare-earth anisotropic magnet powder (rare-earth magnet powder) and epoxy resin was prepared, and a preliminary compact obtained by preliminarily subjecting the compound to compression molding was further prepared. The epoxy resin amount in the compact was of 2.75 mass % to the entire of the compound. The preliminary compact was prepared by subjecting eight grams of the compound to low pressure molding into a hollow cylindrical shape of outer diameter: 28.10 mm and inner diameter: $\phi$26.30 mm under a molding pressure of 50 MPa at room temperature.

Note that the above rare-earth magnet powder was produced in the following manner. An alloy ingot was produced through melting/casting to have a composition of Fe-12.5% Nd-6.4% B-0.3% Ga-0.2% Nb (unit: atomic %). That ingot was subjected to a homogenization treatment under 1140° C. to 1150° C. in argon gas atmosphere during 40 hours. The treated ingot was coarsely crushed into pieces of average grain size: 10 mm or less using a jaw crusher. The crushed pieces underwent a d-HDDR process comprising a low temperature hydrogenation step, a high temperature hydrogenation step, a first exhaust step and a second exhaust step with the following conditions. At first, each sample of alloy was caused to sufficiently absorb hydrogen in hydrogen gas atmosphere of a hydrogen pressure of 100 kPa at room temperature (low temperature hydrogenation step).

Heat treatment was then performed in hydrogen gas atmosphere of 30 kPa (hydrogen pressure) at 800° C. during 480 minutes (high temperature hydrogenation step). Subsequently, further heat treatment was performed in hydrogen gas atmosphere of 0.1 to 20 kPa of hydrogen pressure during 160 minutes while maintaining the temperature at 800° C. (first exhaust step). Finally, cooling was performed in vacuum ambient of $10^{-1}$ Pa or less during 60 minutes while vacuuming by using a rotary pump and a diffusion pump (second exhaust step). NdFeB based rare-earth anisotropic magnet powder (rare-earth magnet powder) comprising magnet particles of average particle diameter: 80 μm was thus produced. Note that the average particle diameter as used herein was obtained by measuring a weight of each class after sieve classification and calculating a weighted average.

Further, surface-activating agent solution was added to the rare-earth magnet powder and vacuum-dried while being stirred. The surface-activating agent solution used herein was silane based coupling agent (NUC silicone A-187 available from Nippon Unicar Company Limited) doubly diluted by ethanol. Rare-earth magnet powder was thus obtained in which the particle surface was coated with the surface-activating agent. The obtained rare-earth magnet powder and epoxy resin were heated and kneaded, and the previously-described compound was thereby obtained.

(2) Tubular Cavity

FIG. 1 illustrates a hollow cylindrical cavity C to be filled with the preliminary compact and a molding die 1 that performs heating and compression molding for the preliminary compact. This molding die 1 comprises: a hollow cylindrical dice 11; a solid cylindrical core 12 inserted into the dice 11; a hollow cylindrical lower punch 13 to be a bottom surface of a hollow cylindrical space (cavity) formed between the dice 11 and the core 12; and a hollow cylindrical upper punch 14 provided to oppose the lower punch 13.

(3) Filling Step

The above preliminary compact was put into the hollow cylindrical cavity C (filling step). During that operation, the temperature of the molding die 1 was preliminarily maintained at 150° C. In that warm state, the hollow cylindrical cavity C had outer diameter: 28.20 mm and inner diameter: φ26.20 mm. Accordingly, the gap width (c) of the hollow cylindrical cavity C was 1 mm.

(4) Heating/Molding Step

The preliminary compact in the hollow cylindrical cavity C was compressed using the lower punch 13 and the upper punch 14 while the temperature of the molding die 1 was maintained at 150° C. Molding pressure during that operation was 160 MPa. A hollow cylindrical compact G (tubular compact) was thus obtained to have the same diameter as the hollow cylindrical cavity C and a length of 15 mm Note that the compression molding was performed while applying an aligning magnetic field of 1.5 T to the hollow cylindrical cavity C. Note also that semi-radial alignment was performed herein on the assumption of a stator for four-pole motor. Note further that the semi-radial alignment as used herein means that the magnet particles are distributed in main pole portions such that the magnetization easy axes are directed in normal directions of the circumferential side surface while the magnet particles are distributed in transition portions between the main pole portions such that the magnetization easy axes are gradually directed in circumferentially tangential directions as they come close to neutral positions, and after being in the circumferentially tangential directions at the neutral positions, the magnetization easy axes are gradually directed in the normal directions of the circumferential side surface as they are separated from the neutral positions.

(5) Discharging/Press-Fitting Step

Figure 2:
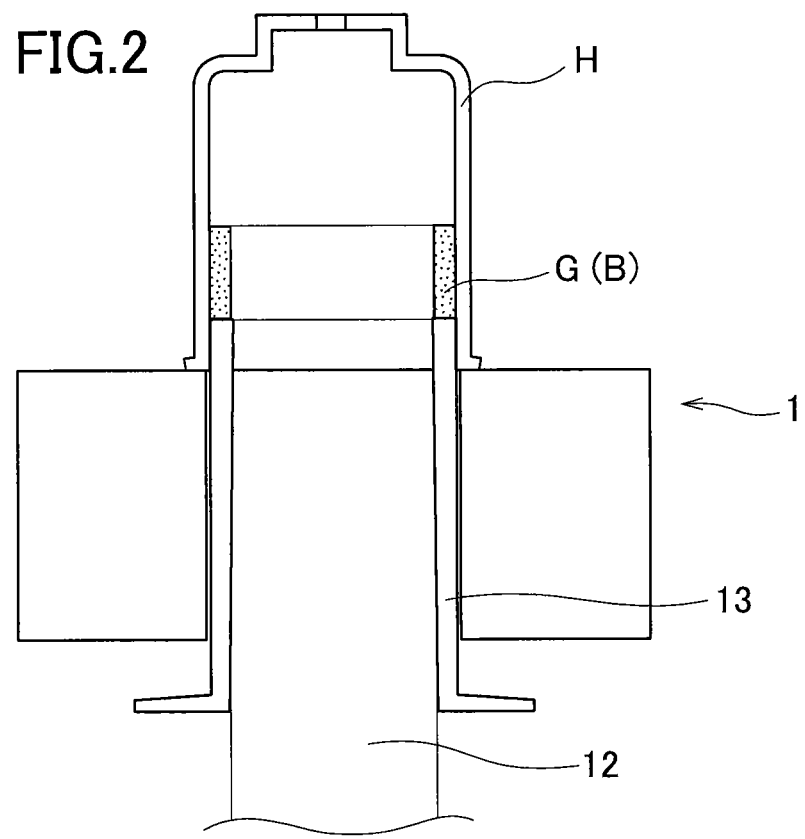
FIG. 2 is a schematic view illustrating an aspect of the discharging/press-fitting step.

After the heating/molding step, the upper punch 14 was immediately evacuated and the housing H was placed coaxially with the hollow cylindrical cavity C. Thereafter, as shown in FIG. 2, the lower punch 13 was caused to move upward and the hollow cylindrical compact G was press-fitted into the cylinder of the housing H using the core 12 as a guide.

During that operation, the housing H was in a room temperature state and the inner diameter (di) thereof was φ28.03 mm. Further, the outer diameter (do) of the hollow cylindrical compact G immediately after being discharged from the hollow cylindrical cavity C without being press-fitted into the housing H was solely measured as being φ28.23 mm. Therefore, the press-fitting margin (Δd=do−di) of the hollow cylindrical compact G to the housing H is 0.20 mm, and the press-fitting ratio (Δr=Δd/do) is 0.0071 (Sample No. 2).

Note that the end portion of the housing H is opened in a tapered shape, so that the outer peripheral surface of the hollow cylindrical compact G is to easily be guided smoothly into the inner peripheral surface of the housing H. In this example, the amount of time required from the start of the above filling step to the end of the discharging/press-fitting step was an extremely short period (about 10 to 15 seconds).

(6) Heat-Curing Step

The housing H press-fitted thereto with the hollow cylindrical compact G was heated at 200° C. during 30 minutes in a heating furnace in the air. A stator (not shown) was thus obtained in which the hollow cylindrical bonded magnet B was pressure-bonded to the inner surface of the housing H.

<Measurements>

(1) The obtained stator was used as the basis to measure an extracting load (shifting load) indicative of the pressure-bonding force between the housing H and the ring bonded magnet B. The extracting load was measured by fixing the housing H to a tensile tester while pushing up the magnet end portion of the hollow cylindrical bonded magnet B using a jig.

(2) Similar measurements were performed for stators with different press-fitting margins. Extracting load, press-fitting margin and other items obtained for each stator in such a manner are shown in Table 1 and FIG. 4 (Sample No. 1 to Sample No. 5).

(3) In addition, stators were also produced by the conventional method where the hollow cylindrical compact G was not directly press-fitted into the housing H and previously thermally cured hollow cylindrical bonded magnet B was press-fitted into the housing. In those cases, stators with various press-fitting margins were produced and respective extracting loads were measured in a similar manner to the above. Each extracting load and other items obtained in such a manner are also shown in Table 1 and FIG. 4. Note that the production condition for each sample is as described in the above unless otherwise stated. Note also that Sample No. C 1 in Table 1 was not able to be measured for the extracting load because cracks occurred in the hollow cylindrical bonded magnet B during the press-fitting thereof.

(4) The outer peripheral surface of a housing H like Sample No. 2 in Table 1 was cut with a width of 1.4 mm in the longitudinal direction. That sample was produced by performing the above heat-curing step at 180° C. during 60 minutes. The extracting load of that sample after being cut was measured as being 23 to 31 N. That extracting load is considered to be based on the adhesion of the outer peripheral surface of the hollow cylindrical bonded magnet B to the inner peripheral surface of the housing H via the epoxy resin. Note, however, that the extracting load before being cut was 1400 N, it has thus been found that the contribution of the adhesion to the extracting load is 2% to 3% at the most.

<Evaluation>

Figure 4:
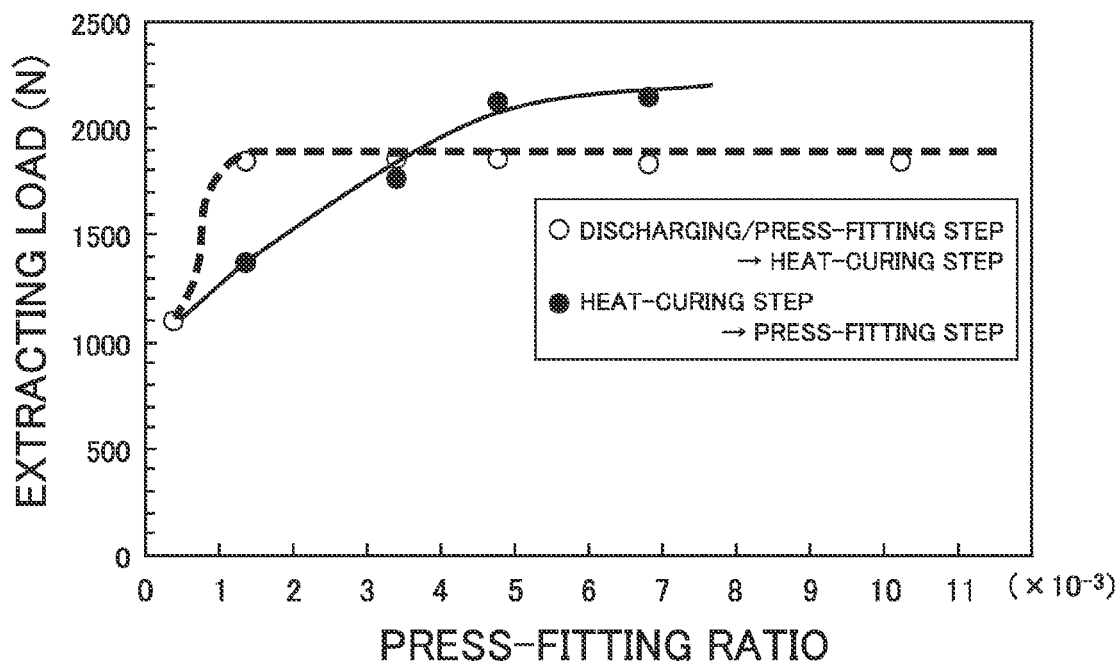
FIG. 4 is a graph illustrating relationships between extracting loads (shifting loads) and press-fitting ratios associated with a housing and a hollow cylindrical bonded magnet.

(1) As apparent from Table 1 and FIG. 4, sufficiently high extracting load (shifting load) can be obtained for the present example where the heat-curing step is performed after the discharging/press-fitting step. Specifically, it has been found that even extremely small press-fitting ratio of 0.0005 or less ensures sufficient extracting load in practical use. It also has been found that the extracting load further increases when the press-fitting ratio is 0.001 or more, and above that, even if the press-fitting ratio changes, the extracting load scarcely changes and is stabilized within a range of 1800 to 1900 N.

In contrast, in the case of the conventional method where the hollow cylindrical bonded magnet B is press-fitted into the housing H after the heat-curing step, it has been found that the extracting load is substantially proportional to the press-fitting ratio within a range where the press-fitting ratio (press-fitting margin) is small while the extracting load is insufficient if the press-fitting ratio is small. It also has been found that, if the press-fitting ratio increases to some extent, the extracting load no longer increases and cracks occur if the press-fitting ratio excessively increases.

(2) The reason why the extracting load according to the present example is stable regardless of the press-fitting ratio may be considered as below. It may be mentioned at first that, as a result of the thermosetting resin as the binder having been sufficiently thermally cured due to the heat-curing step, the modulus of longitudinal elasticity (E) of the hollow cylindrical bonded magnet B becomes larger than that of the hollow cylindrical compact G and is stabilized.

Figure 3:
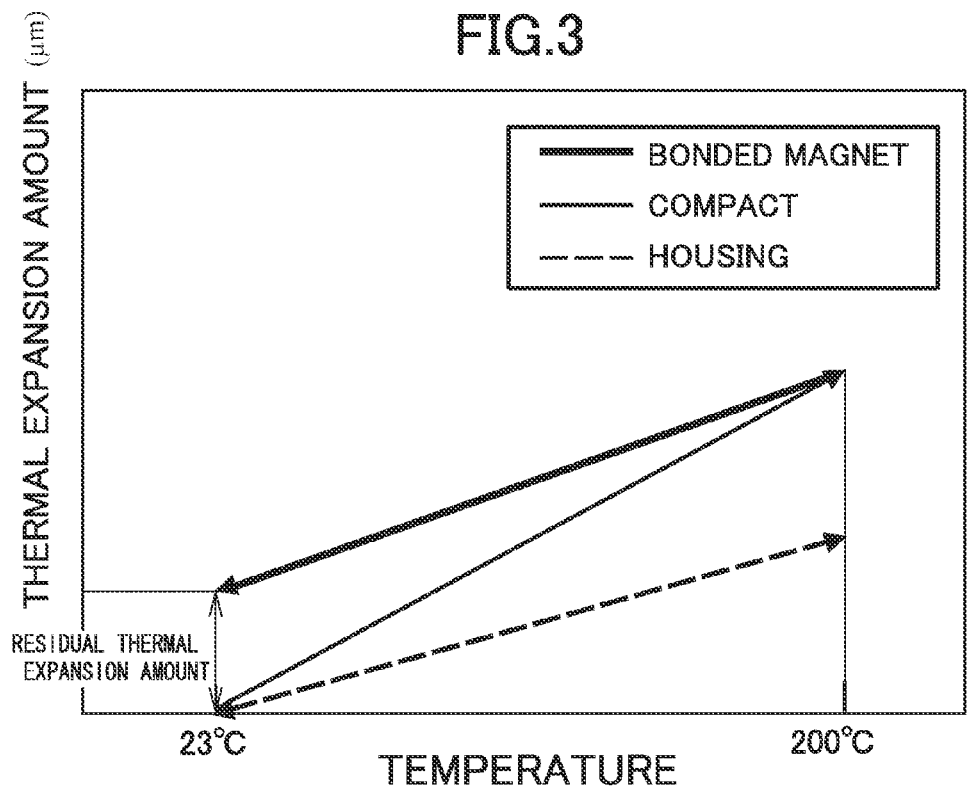
FIG. 3 is an explanatory diagram illustrating changes in heat expansion amounts of a housing, compact and bonded magnet.

Next, when the hollow cylindrical compact G obtained through the heating/molding step was subjected to the same thermal history as the heat-curing step without being press-fitted into the housing H, the outer diameter (of the hollow cylindrical bonded magnet B) after the heating increased with about 30 to 40 μm (0.03 to 0.04 mm) compared to the outer diameter (of the hollow cylindrical compact G) before the heating. This is because, as shown in FIG. 3, the linear thermal expansion coefficient changed from $17 \times 10^{-6}$ (1/° C.) to $10 \times 10^{-6}$ (1/° C.) due to the transformation of the hollow cylindrical compact G to the hollow cylindrical bonded magnet B by the heat-curing process (cure thermal process). In other words, a thermal expansion amount difference (residual thermal expansion amount) occurred depending on the thermal history and the change in linear thermal expansion coefficient. More specifically, a thermal expansion amount difference of about 33.5 μm was generated under the condition of the linear thermal expansion coefficient difference: $7 \times 10^6$ (1/° C.), the heating temperature difference: 177° C. (=200° C.−23° C.), and the outer diameter: φ28.23 mm.

On the other hand, the linear thermal expansion coefficient of the housing H is $11 \times 10^{-6}$ (1/° C.), but this linear thermal expansion coefficient is reversible and basically not affected by the thermal history. That is, even if the temperature increases due to the heat-curing step, the inner diameter thereof recovers its original dimension after being cooled to room temperature (23° C.). Therefore, it appears that, if the above-described hollow cylindrical bonded magnet B is press-fitted into the housing H, then the residual thermal expansion amount caused in the hollow cylindrical bonded magnet B due to the thermal history becomes responsible for the press-fitting margin between the hollow cylindrical bonded magnet B and the housing H thereby generating the pressure-bonding force therebetween.

Further, after the hollow cylindrical compact G was once directly press-fitted into the housing H through the discharging/press-fitting step, only the hollow cylindrical compact G was extracted from the housing H without undergoing the heat-curing step. The extracted hollow cylindrical compact G was solely subjected to the heat-curing process (cure thermal process). As a result, the outer diameter of the hollow cylindrical bonded magnet B obtained after the heat-curing increased with 60 to 70 μm (0.06 to 0.07 mm) compared to the outer diameter of the hollow cylindrical compact G This tendency (thermal expansion amount) was unlikely to change with the change in the press-fitting ratio during the discharging/press-fitting step.

Since the residual thermal expansion amount is about 30 to 40 μm if the press-fitting into the housing H is not performed, an additive amount of the thermal expansion amount (release thermal expansion amount) caused if the press-fitting into the housing H is performed is also to be about 30 to 40 μm (0.03 to 0.04 mm). The reason why such a release thermal expansion amount is caused may be considered, as previously described, due to that a strain generated in the hollow cylindrical compact G when it is press-fitted into the housing H is accumulated as an internal stress, and the internal stress is released during the cure thermal process (heat-curing step).

In consideration of the above, if the heat-curing step is performed after the hollow cylindrical compact G is press-fitted into the housing H during the discharging/press-fitting step, then the above-described increase in the modulus of longitudinal elasticity and the generation of the press-fitting ratio based on the residual thermal expansion amount and the release thermal expansion amount act synergistically to cause a surface pressure between the hollow cylindrical bonded magnet B and the housing H. Therefore, it appears that a large and stable surface pressure develops between the hollow cylindrical bonded magnet B according to the present example and the housing H and a stator can thereby be obtained in which the hollow cylindrical bonded magnet B and the housing H are strongly pressure-bonded.

TABLE 1

| SAMPLE NO. | STEP | PRESS-FITTING MARGIN (Δd) (mm) | PRESS-FITTING RATIO (Δd/do) | EXTRACTING LOAD (N) |
|---|---|---|---|---|
| 1 | DISCHARGING/ | 0.30 | 0.0106 | 1839 |
| 2 | PRESS- | 0.20 | 0.0071 | 1827 |
| 3 | FITTING STEP | 0.14 | 0.0050 | 1849 |
| 4 | ↓ | 0.10 | 0.0035 | 1857 |
| 5 | HEAT-CURING | 0.04 | 0.0014 | 1843 |
| 6 | STEP | 0.01 | 0.0004 | 1124 |
| C1 | HEAT-CURING STEP | 0.30 | 0.0106 | CRACKS OCCUR |
| C2 | ↓ | 0.20 | 0.0071 | 2146 |
| C3 | PRESS-FITTING | 0.14 | 0.0050 | 2113 |
| C4 | STEP | 0.10 | 0.0035 | 1757 |
| C5 | | 0.04 | 0.0014 | 1369 |
| C6 | | 0.01 | 0.0004 | 1120 |

The invention claimed is:

1. A production method for a case-integrated bonded magnet comprising:
   filling a tubular cavity with a magnet raw material, the magnet raw material including one or more types of rare-earth magnet powder and a thermosetting resin;
   heating the magnet raw material to cause the thermosetting resin to be in a softened state or a molten state while compressively molding the magnet raw material to obtain a tubular compact;
   discharging the tubular compact from the tubular cavity while press-fitting the tubular compact into a metal tubular case, the metal tubular case having an inner peripheral surface coaxial with the tubular cavity; and
   heating the tubular compact with the tubular case to cure the thermosetting resin, wherein a case-integrated bonded magnet is obtained by integrating the tubular compact with the tubular case.

2. The production method for a case-integrated bonded magnet according to claim 1, wherein the thermosetting resin includes an epoxy resin.

3. The production method for a case-integrated bonded magnet according to claim 1, wherein the thermosetting resin is within a range of 1 to 10 mass % of the magnet raw material as a whole.

4. The production method for a case-integrated bonded magnet according to claim 1, wherein
a press-fitting ratio (Ar) is within a range of 0.0001 to 0.05 when a discharging/press-fitting step is initiated,
the press-fitting ratio is a ratio of a press-fitting margin ($\Delta d$) of the tubular compact and an outer diameter (do) of the tubular compact ($\Delta r = \Delta d/do$), and
the press-fitting margin is a dimensional difference between the outer diameter of the tubular compact and an inner diameter (di) of the tubular case ($\Delta d = do - di$).

5. The production method for a case-integrated bonded magnet according to claim 1, wherein a heating/molding step is such that a molding pressure is within a range of 50 to 500 MPa.

6. The production method for a case-integrated bonded magnet according to claim 1, wherein the tubular case is comprised of a magnetic material.

* * * * *